United States Patent

Sugimura et al.

(10) Patent No.: US 6,706,357 B2
(45) Date of Patent: Mar. 16, 2004

(54) JOINING STRUCTURE OF RESIN PARTS

(75) Inventors: Norikazu Sugimura, Sashima-gun (JP); Sadao Nakajima, Sashima-gun (JP)

(73) Assignee: Kyosan Denki Co., Ltd., Sashima-gun (JP)

( * ) Notice: Subject to any disclaimer, the term of this patent is extended or adjusted under 35 U.S.C. 154(b) by 0 days.

(21) Appl. No.: 10/101,880

(22) Filed: Mar. 21, 2002

(65) Prior Publication Data

US 2002/0136856 A1 Sep. 26, 2002

(30) Foreign Application Priority Data

Mar. 26, 2001 (JP) ........................... 2001-088919

(51) Int. Cl.⁷ ............................................. B32B 3/10
(52) U.S. Cl. .......................................... 428/60; 428/58
(58) Field of Search ................. 428/58, 60; 156/73.5, 156/304.5

(56) References Cited

U.S. PATENT DOCUMENTS 4,919,987 A    4/1990  Manner

FOREIGN PATENT DOCUMENTS

| EP | 0 483 563 A2 | 5/1992 |
|---|---|---|
| EP | 1 090 737 A1 | 4/2001 |
| FR | 2 713 540 A1 | 6/1995 |
| JP | U 63-90063 | 6/1988 |
| JP | 01 122679 A | 5/1989 |
| JP | A 8-132529 | 5/1996 |
| JP | A 8-142197 | 6/1996 |
| JP | A 9-164595 | 6/1997 |
| JP | 10 193460 A | 7/1998 |

*Primary Examiner*—Alexander S. Thomas
(74) *Attorney, Agent, or Firm*—Oliff & Berridge, PLC

(57) ABSTRACT

A joining structure is provided which includes a first resin member and a second resin member having respective joining portions that are joined together by friction welding. The joining structure further includes a projecting wall that is opposed to the joining portions of the first and second resin members with a spacing therebetween. In the joining structure, at least one notch is formed in a surface of the projecting wall that faces the joining portions of the first and second resin members.

8 Claims, 8 Drawing Sheets

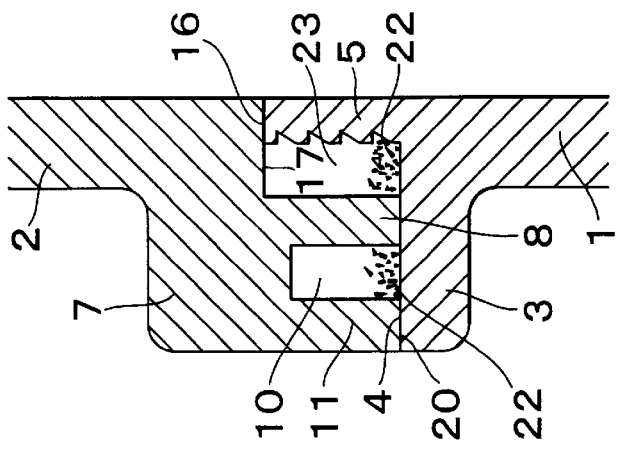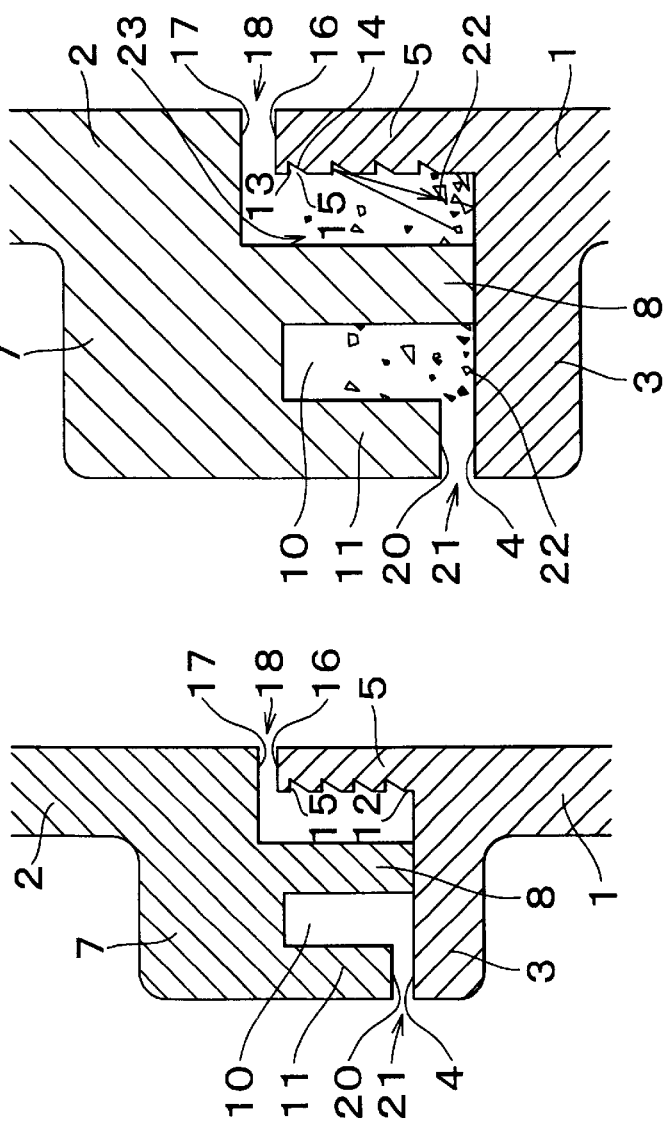

MINUTE CIRCULAR VIBRATIONS

PRESSURE

FRICTION WELDING

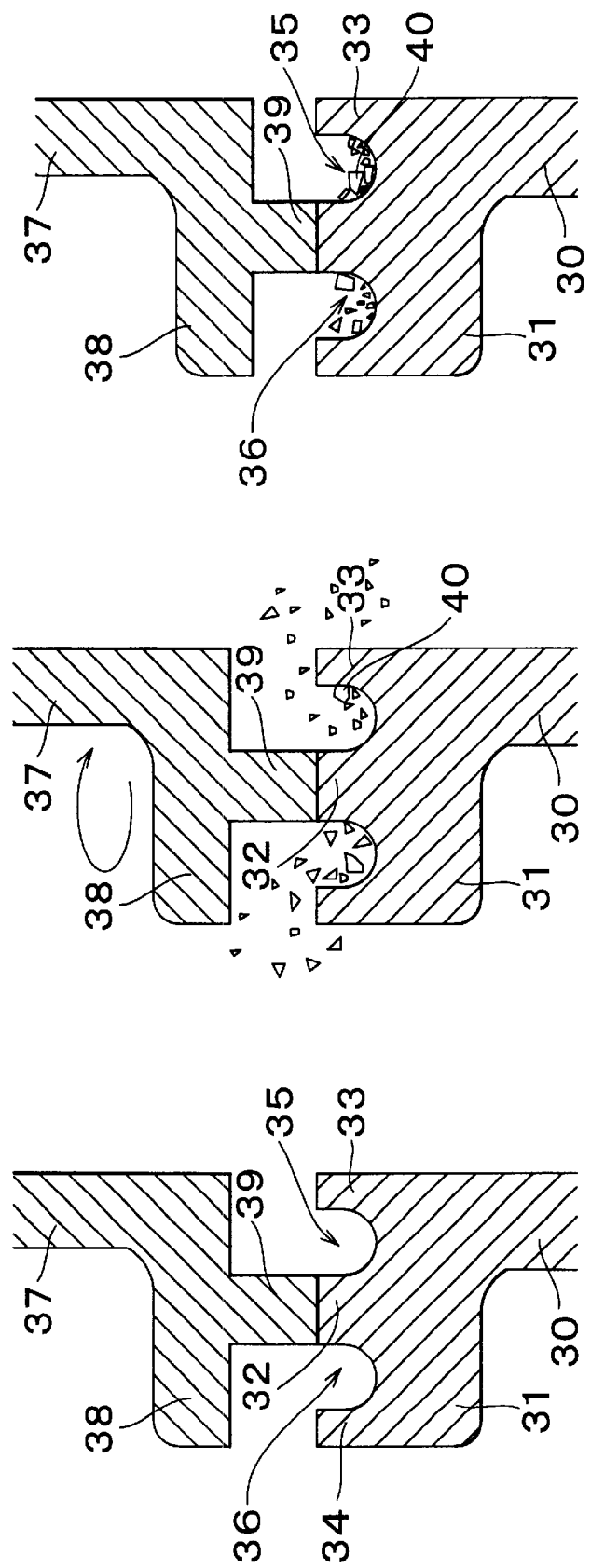

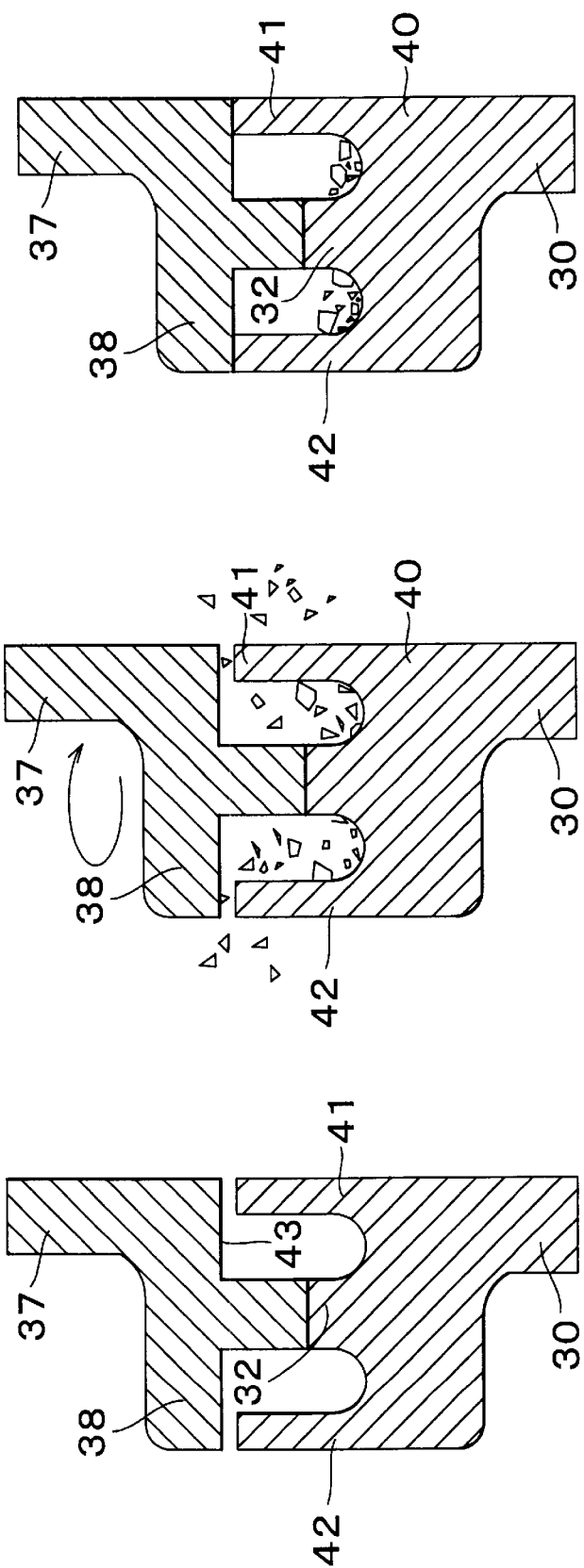

JOINING STRUCTURE OF RESIN PARTS

INCORPORATION BY REFERENCE

The disclosure of Japanese Patent Application No. 2001-088919 filed on Mar. 26, 2001 including the specification, drawings and abstract is incorporated herein by reference in its entirety.

BACKGROUND OF THE INVENTION

1. Field of the Invention

The invention relates generally to a joining structure in which two or more resin parts are joined together to form an integral resin product or article, and more particularly to a joining structure of resin parts which are joined together by friction welding, such as orbital welding, that utilizes heat generated by friction between joining members (i.e., the resin parts). In particular, the invention is concerned with a technique for preventing fragments of the resin parts dispersed or scattered during frictional movements thereof from entering the inside of the resulting resin product.

2. Description of Related Art

In these days, various types of resin parts have been used in a wide range of industrial or technical fields. Some of the resin parts have a final shape or configuration that is too complicated to be achieved only solely by molding. In other cases in which another member or component is mounted within a resin structure, for example, a plurality of sections to be finally integrated into a single resin structure are formed by molding, and are then joined together into the final structure.

Various methods of integrating resin parts have been proposed and actually practiced. These methods can be systematically classified into some groups as shown in FIG. 6. More specifically, resin joining methods are roughly classified into "bonding", "mechanical fastening or clamping", "welding", and "insert". A technology for joining two members by use of friction, to which the invention pertains, belongs to the "welding" category, and more particularly to "thermal welding". The "thermal welding" is classified into "external heating" and "internal heating". The technology to which the invention relates belongs to "internal heating", and more particularly to "friction welding", such as "ultrasonic welding", "vibration welding", "orbital welding" and "spin welding", with which parts are joined into a product or an article by utilizing frictional heat.

Among various parts of a fuel supply system of a vehicle engine, for example, certain products, such as a fuel pump and a fuel filter, are more likely to be mounted within a fuel tank so as to satisfy fuel vapor gas regulations in recent years, though they were conventionally mounted outside the tank. Upon final assembling of these parts, the above-indicated products may be subjected to a drying process after mounted within the tank, and therefore the products are required to be highly resistant to heat having a temperature that is much higher than that required in the case where the products are mounted outside the tank. To meet this requirement, the products need be made of materials having high heat resistance, including, for example, reinforced resins, such as PA resin, into which glass fibers, or the like, are mixed. In addition to the products or parts located inside the tank, products or parts located outside the tank are also desired to be made of materials having higher heat resistance, in order to achieve improved durability of the fuel supply system.

Among various friction welding technologies as described above, orbital welding, in particular, is suitably employed for joining parts made of resin having high heat resistance. The basic principle of the orbital welding for joining two parts is illustrated in FIGS. 7A, 7B and 7C. More specifically, one of the two parts undergoes minute circular vibratory motions in a horizontal plane (i.e., in a plane of abutting surfaces of the two parts) while the one part is pressed against the other part, so that the two parts are welded to each other with fused resin between their abutting surfaces. As shown in FIG. 7A, a member A is placed on a member B that is held stationary. Then, the member A is subjected to minute circular vibrations while being pressed against the member B, as shown in FIG. 7B. At this time, the vibrations occur in a plane (i.e., a plane of the abutting surfaces), causing friction of a constant velocity at the abutting surfaces, thus permitting uniform welding. As a result, heat generated by the friction normally fuses the abutting surfaces of the parts in several seconds, and the parts are automatically positioned at their positions where the vibrations stopped. After holding the parts under pressure for one to two seconds, during which resin solidifies, the welding process is finished. In this manner, a welded product as shown in FIG. 7C is completed.

The orbital welding is carried out in the manner as described above, and is particularly advantageous in the following six points:

1. The orbital welding enables joining of parts having various shapes, allowing an increased freedom in the shape or design of the parts.
2. The abutting surfaces of the parts are uniformly welded.
3. The resin part to be welded may include a flange having a small width, permitting a burr to be uniformly formed upon welding.
4. The strength of the welded portion is stable.
5. An acceleration G that appears during welding due to constant-velocity motion of the resin part is 10G or smaller, causing almost no stress to the base on which the parts are mounted.
6. The orbital welding can be employed for a wide range of materials, including those having high heat resistance.

Thus, the orbital welding is suitably employed for joining two members when producing various parts to be installed on vehicles as described above.

FIGS. 8A–8C illustrate a typical example in which two parts are joined together by orbital welding. More specifically, a lower member 30 has a flange 31 that is formed with an upper protrusion 32 to be welded, and an inside projecting wall 33 and an outside projecting wall 34 are formed on the opposite sides of the upper protrusion 32 to thus form an inside groove 35 and an outside groove 36. On the other hand, an upper member 37 to be welded and fixed onto the first member 30 has a flange 38 that is formed with a lower protrusion 39 to be welded. As shown in FIG. 8A, the first member 30 and the second member 37 are assembled together such that the lower protrusion 39 of the second member 37 abuts on the upper protrusion 32 of the first member 30.

Next, according to the orbital welding method as shown in FIGS. 7A, 7B and 7C, the upper member 37 is subjected to minute circular vibrations while being pressed against the lower member 30. At this time, minute fragments of the resin parts are produced at abutting portions of the upper protrusion 32 and the lower protrusion 39 where frictional vibrations occur. The properties of the fragments vary depending upon the material of the parts to be welded, degree of frictional vibrations, pressing force, and so forth. In any event, the size of the fragments decreases as the heat resistance and rigidity of the welded material increases. In particular, a large number of fragments are likely to be produced when a reinforced resin, such as PA resin, containing glass fibers is used. As shown in FIG. 8B, many of the fragments 40 produced due to the vibrations fall into the inside groove 35 and the outside groove 36 formed on the opposite side of the upper protrusion 32, but part of the fragments 40 pop out of the inside groove 35 and the outside groove 36, overpassing the inside projecting wall 33 and the outside projecting wall 34, respectively. If the product in question is in the form of a container, fragments that pass the inside projecting wall 33 enter the interior of the container.

Upon completion of the welding process in which minute circular vibrations are applied as described above, a welded product as shown in FIG. 8C is provided. When this product is moved or in use, the fragments 40 accumulated in the bottoms of the inside groove 35 and the outside groove 36 may fall out of these grooves 35, 36, and enter the inside of the container. If the container-shaped product is, for example, a fuel cut valve, a liquid level sensing valve, a tank pressure control valve, or the like, of a fuel vapor gas treating device of a fuel system of a vehicle, such minute fragments entering the container may adhere to functional or operating portions of these products, resulting in, for example, a sealing failure at a valve portion, which may cause a liquid fuel to flow out of the system.

The above-described problem encountered in the above-described known joining structure may be partially solved by an arrangement as shown in FIGS. 9A, 9B and 9C by way of example. In the joining structure of FIG. 9A, inside projecting wall 41 and outside projecting wall 42 formed on the opposite sides of the upper protrusion 32 of the lower member 30 have a greater height than the above-described inside projecting wall 33 and outside projecting wall 34 as shown in FIG. 8A. Thus, the inside and outside projecting walls 41, 42 formed with sufficiently large height function to prevent scattering of fragments of parts to be welded. The heights of the inside and outside projecting walls 41, 42 are determined such that the inside projecting wall 41 and the outside projecting wall 42 abut on a bottom surface 43 of the flange 38 of the upper member 37 at the time of completion of the welding process of the parts, as shown in FIG. 9C.

After the parts as shown in FIG. 9A are welded together into a product, the fragments 40 of the parts accumulated in the inside groove 35 during welding are prevented from passing the inside projecting wall 35 and falling into the inside of the container during transportation of the product or during use as in the case of FIG. 8C. Furthermore, the increase in the height of the inside projecting wall 41 leads to reduction in the amount of fragments 40 that pop out of the inner and outer grooves 35, 36, over the respective projecting walls 41, 42, while minute circular vibrations are being applied to the upper member 37 as shown in FIG. 9B.

However, even with the height of the inside and outside projecting walls 41, 42 increased as described above, some of the fragments 40 overpass the inside projecting wall 41 and pop into the inside of the container, as shown in FIG. 9B. In this case, the fragments may adhere to various valves of the fuel system as described above, thus causing a problem, such as a sealing failure.

SUMMARY OF THE INVENTION

It is therefore an object of the invention to provide a joining structure of resin parts, which structure is able to prevent fragments of the parts produced due to friction at the interface from entering a joining portion or the interior of a resulting product when the resin parts are joined together by frictional welding, such as orbital welding.

To accomplish the above and/or other object(s), there is provided according to one aspect of the invention a joining structure which comprises: (a) a first resin member and a second resin member having respective joining portions that are joined together by friction welding, and (b) a projecting wall that is opposed to the joining portions of the first and second resin members with a spacing therebetween. In the joining structure, at least one notch is formed in a surface of the projecting wall that faces the joining portions of the first and second resin members.

When the resin members are joined together by friction welding, such as orbital welding, fragments of the resin members are produced by frictional forces, and are scattered around during welding. With the joining structure as described above, the fragments hit against walls of the notches, and are thus prevented from overpassing the upper end face of the projecting wall and popping out of the structure.

In one preferred embodiment of the invention, the projecting wall is formed as an integral part of one of the first and second resin members. In this case, the end face of the projecting wall may abut on an opposed surface of the other resin member at the time of completion of joining, so that fragments of the first and second resin members are confined in a space between the joining portions and the projecting wall. Consequently, the fragments are prevented from popping out of the structure during movements or use of the resulting product.

According to another aspect of the invention, there is provided a joining structure which comprises: (a) a first resin member and a second resin member having respective joining portions that are joined together by frictional welding, (b) a projecting wall that is opposed to the joining portions of the first and second resin members with a spacing therebetween, and (c) a liquid received in a bottom portion of a space defined between the projecting wall and the joining portions. With this joining structure, fragments of the resin members produced by frictional forces adhere to the liquid, and are thus surely prevented from overpassing the upper end face of the projecting wall and popping out of the structure.

In one preferred embodiment of the above aspect of the invention, at least one notch is formed in a surface of the projecting wall that faces the joining portions of the first and second resin members. In this case, the notches of the projecting wall and the liquid cooperate with each other to prevent scattering of the fragments with further improved reliability by the notches of the projecting wall and the liquid.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein:

FIGS. 1A, 1B and 1C are views showing a cross section of a joining structure with notches according to one exemplary embodiment of the invention and a process of effecting orbital welding with respect to the joining structure, wherein FIG. 1A is a cross-sectional view showing an assembly of two members, and FIG. 1B is an enlarged cross-sectional view showing fragments of the members that are scattered when the upper member is subjected to minute circular vibrations, and FIG. 1C is a cross-sectional view of the joining structure at the time of completion of the welding process;

FIGS. 2A, 2B and 2C are views showing a cross section of a joining structure with notches according to another exemplary embodiment of the invention and a process of effecting orbital welding with respect to the joining structure, wherein FIG. 2A is a cross-sectional view showing an assembly of two members, and FIG. 2B is an enlarged cross-sectional view showing fragments scattered when the upper member is subjected to minute circular vibrations, while FIG. 2C is a cross-sectional view of the joining structure at the time of completion of the welding process;

FIGS. 3A, 3B and 3C are views showing a cross section of a joining structure with grooves according to a further exemplary embodiment of the invention and a process of effecting orbital welding with respect to the joining structure, wherein FIG. 3A is a cross-sectional view showing an assembly of two members, and FIG. 3B is an enlarged cross-sectional view showing fragments scattered when the upper member is subjected to minute circular vibrations, while FIG. 3C is a cross-sectional view of the joining structure at the time of completion of the welding process;

FIGS. 7A, 7B and 7C are perspective view showing the basic principle of the orbital welding method, wherein FIG. 7A shows a state in which two members are assembled together, and FIG. 7B shows a state in which minute circular vibrations are applied to one of the two members, and FIG. 7C shows a final product obtained upon completion of welding;

FIGS. 8A, 8B and 8C are views showing a cross section of a known joining structure and a process of effecting orbital welding with respect to the joining structure, wherein FIG. 8A is a cross-sectional view showing an assembly of two members, and FIG. 8B is an enlarged cross-sectional view showing fragments of the two members scattered when the upper member is subjected to minute circular vibrations, while FIG. 8C is a cross-sectional view of the joining structure at the time of completion of the welding process; and FIGS. 9A, 9B and 9C are views showing a cross section of another known joining structure and a process of effecting orbital welding with respect to the joining structure, wherein FIG. 9A is a cross-sectional view showing an assembly of two members, and FIG. 9B is an enlarged cross-sectional view showing fragments of the two members scattered when the upper member is subjected to minute circular vibrations, while FIG. 9C is a cross-sectional view of the joining structure at the time of completion of the welding process.

DETAILED DESCRIPTION OF PREFERRED EMBODIMENTS

Figure 2A:
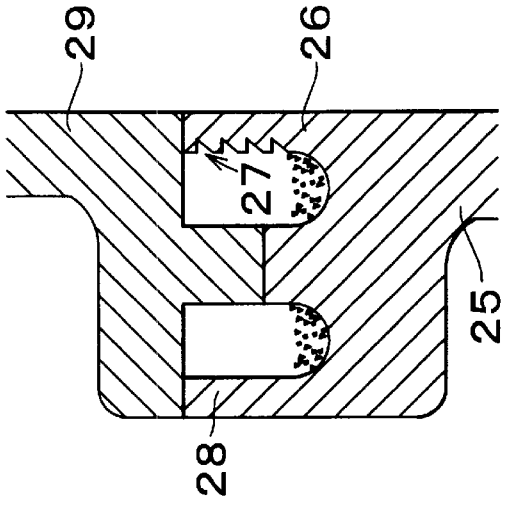

Some exemplary preferred embodiments of the invention will be described with reference to the accompanying drawings. FIGS. 1A, 1B and 1C illustrate a first embodiment of the invention. FIG. 1A, which corresponds to FIG. 8A and FIG. 9A as described above with respect to the related art, shows an assembly of a first member 1 serving as a lower member of a container, and a second member 2 serving as an upper member (e.g., a lid) of the container, which members 1, 2 are to be subjected to orbital welding. The first member 1 includes a flange 3, and an inside projecting wall 5 formed at the inside of an upper surface 4 of the flange 3. The inside projecting wall 5 functions to prevent scattering or dispersing of fragments of the members 1, 2 during orbital frictional welding. The second member 2 includes a flange 7, which has a protrusion 8 formed on a central portion of the lower surface of the flange 7. The protrusion 8 rests on the upper surface 4 of the flange 3 of the first member 1. The second member 2 further includes an outside projecting wall 11 located outwardly of the protrusion 8 with a clearance 10 formed therebetween.

A wall surface 12 of the inside projecting wall 12, which faces the protrusion 8 of the second member 2, has an array of four wedge-shaped notches 15 that are arranged in the vertical direction. As shown in an enlarged view of FIG. 1B, each of the wedge-shaped notches 15 is defined by a horizontal face 13 and an inclined face 14 formed beneath the horizontal face 13. The notches 15 have a cross-sectional shape as shown in FIG. 1B, and form a set of four horizontal grooves in the wall 12 of the projecting wall 5.

With the first member 1 and the second member 2 thus assembled together as shown in FIG. 1A, an inside clearance 18 is provided between an upper end face 16 of the inside projecting wall 5 of the first member 1 and a lower surface 17 of the second member 2. In addition, an outside clearance 21 is provided between a lower end face 20 of the outside projecting wall 11 of the second member 2 and an upper surface 4 of the first member 1. The inside clearance 18 and the outside clearance 21 are formed with substantially the same size. The size of the inside and outside clearances 18, 21 is determined so that the clearances 18, 21 are eliminated (i.e., no clearance is left) as shown in FIG. 1C when the protrusion 8 of the second member 2 is shortened with its end face melted and joined to the first member 1 by orbital welding, as shown in FIG. 1B.

After the first member 1 and the second member 2 are assembled together into the structure as shown in FIG. 1A, the second member 2 is caused to undergo minute circular vibrations while a certain pressing force is applied to the second member 2 against the first member 1, as shown in the enlarged view of FIG. 1B. At this time, an end face of the protrusion 8 of the first member 1 moves under friction relative to the upper surface of the first member 1, and frictional heat is generated at the interface of these two members 1, 2, to start fusing the abutting surfaces of the members 1, 2. Upon start of fusing, fragments 22 of the first and second members 1, 2, having a particular shape depending upon a material of these members 1, 2, are produced due to friction, and are scattered or dispersed around.

The scattering fragments 22 hit against, in particular, the upper horizontal faces 13 of the notches 15 and fall downwards, as indicated by an arrow in FIG. 1B by way of example. As a result, the fragments 22 are prevented from entering the inside of the container, or the like, through the inside clearance 18 between the upper end face 16 of the inside projecting wall 5 of the first member 1 and the lower surface 17 of the flange 7 of the second member 2. Instead, the fragments 22 are accumulated in a bottom portion of a space 23 defined between the wall surface 12 of the inside projecting wall 5 and the inner surface of the protrusion 8. Thus, the notches 15 serve to prevent passage of the fragments over the inside projecting wall 5. As the welding proceeds, the upper end face 16 of the inside projecting wall 5 abuts on the lower surface 17 of the flange 7 of the second member 2 as described above, to provide a welded product as shown in FIG. 1C. In this condition, the fragments 22 accumulated in the bottom portion of the space 23 are kept from coming out of the space 23 during transportation or in use, and are thus confined within the space 23. In the embodiment of FIGS. 1A–1C, the lower end face 20 of the outside projecting wall 11 also abuts on the upper surface 4 of the first member 1 so that the remaining fragments 22 of the first and second members 1, 2 are also confined within a space 10 defined between the outside projecting wall 11 and the protrusion 8.

The product produced according to the embodiment of FIGS. 1A–1C may be in the form of a container, and may serve as a fuel cut valve, a liquid level sensing valve, a tank pressure control valve, or the like, used in a fuel vapor gas treating device of a vehicle, for example. The inside projecting wall 5 is formed with the notches 15 as described above, so as to prevent fragments of the welded members from entering the inside of the container and adhering to a functioning or operating portion(s) (in particular, valve portions) of the above-indicated products, which would cause a sealing failure in the valve portions. If it is also undesirable that the fragments 22 pop out of the container during welding, the outer projecting wall may be formed with notches in the same manner in which the inner projecting wall are formed with the notches 15 as shown in FIG. 1.

Figure 2B:
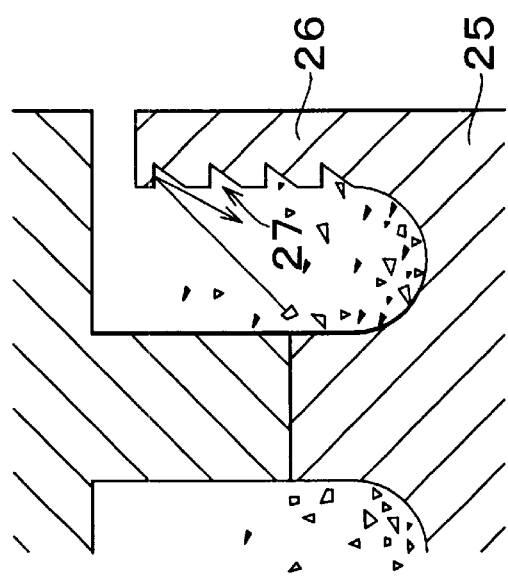
Figure 2C:
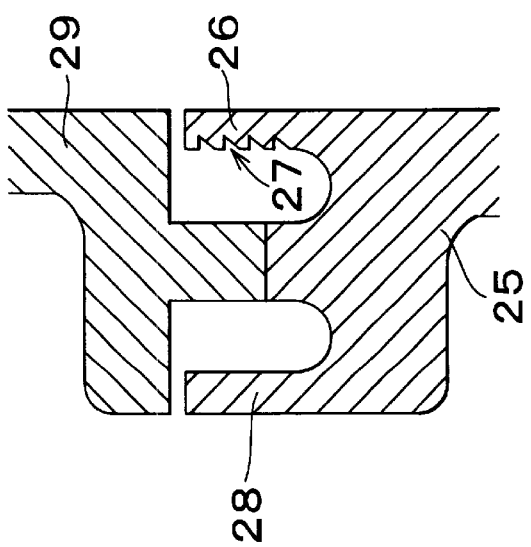

Another embodiment of the invention is illustrated in FIGS. 2A, 2B and 2C, for example. In this embodiment, notches 27 similar to the notches 15 of the first embodiment are formed in an inside projecting wall 26 of a first member 25 corresponding to the inside projecting wall 42 of the first member 30 of the known example as shown in FIG. 9A. First and second members 25, 29 are welded together in the same manner as in the first embodiment, such that fragments of the members 25, 29 hit against the notches 27 and fall downwards, and are thus prevented from popping out of the assembly of the first and second members 25, 29. In the embodiment of FIGS. 2A, 2B and 2C, too, notches may be formed in the outside projecting wall 28, as well as the inside projecting wall 26.

Figure 3C:
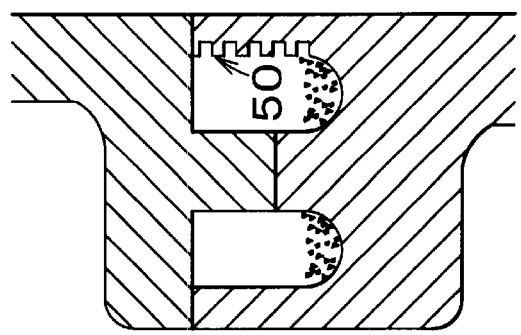
Figure 3B:
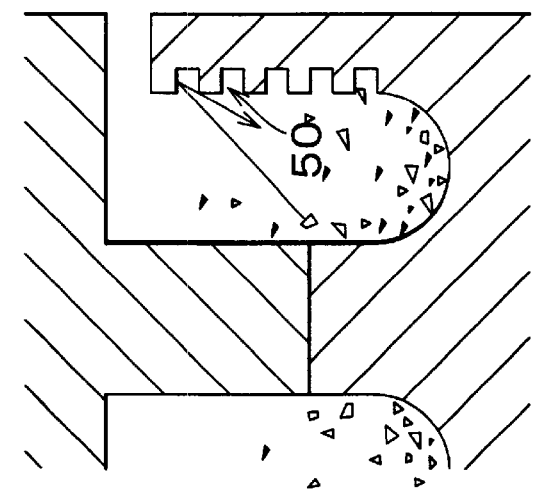
Figure 3A:
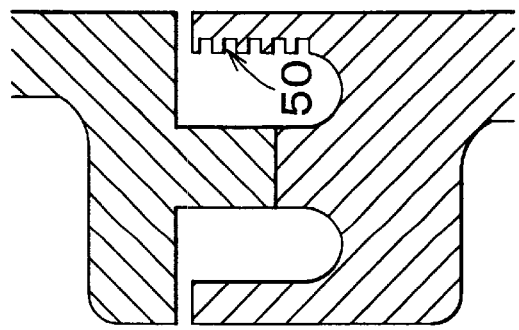

While the notches 15, 27 are in the shape of a wedge in each of the illustrated embodiments, it is possible to form notches 50 each having a square or rectangular cross section, as shown in FIGS. 3A, 3B and 3C by way of example. The square notches 50 function substantially in the same way as the notches 15 or 27. FIGS. 3A, 3B and 3C show respective states (process steps) corresponding to those of FIGS. 1A, 1B and 1C or those of FIGS. 2A, 2B and 2C. The square notches 50 may be employed in the joining structure of the first embodiment as shown in FIGS. 1A, 1B and 1C. In each of the illustrated embodiments, the height of the projecting wall formed with notches is determined so that the wall abuts on the opposed wall (i.e., the lower surface of the second member) at the time of completion of welding so as to enclose the space therein. It is, however, not essential to enclose the inner space of the joining structure, i.e., eliminate clearances between the opposed faces of the first and second members, since the presence of notches on the projecting wall as described above yields a greater effect of preventing fragments from popping out of the structure than in the case where the notches are not provided.

Figure 4A:
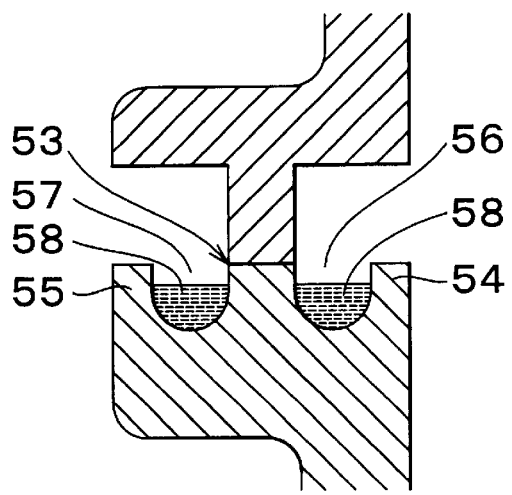
FIG. 4A is a cross-sectional view showing one exemplary embodiment of the invention using a liquid.

In the illustrated embodiments, the notches are formed in the projecting wall disposed around a welded portion of the joining structure so as to prevent fragments of welded parts from scattering over the projecting wall. In another embodiment of the invention, a liquid 58, such as an adhesive or a liquid packing, having a suitable degree of adhesiveness is received in an inside recess 56 formed between a welded portion 53 and an inside projecting wall 54 facing the welded portion 53, and in an outside recess 57 formed between the welded portion 53 and an outside projecting wall 55 facing the welded portion 53, as shown in FIG. 4A. With this arrangement, some of fragments of welded members, which failed to pop out of the recesses 56, 57 over the projecting walls 54, 55, drop into the recesses 56, 57, and adhere to the liquid 58. The fragments thus adhered to the liquid 58 cannot come out of the recesses 56, 57 any longer.

In the embodiment as shown in FIG. 4A, the projecting walls 54, 55 are not designed to close the recesses 56, 57 upon completion of orbital welding. However, the projecting walls 54, 55 may be formed with sufficiently large height, as shown in FIG. 4B so that the walls 54, 55 close the recesses 56, 57 at the time of completion of the orbital welding process, as in the embodiments of FIGS. 1A–1C, 2A–2C and 3A–3C.

Figure 4B:
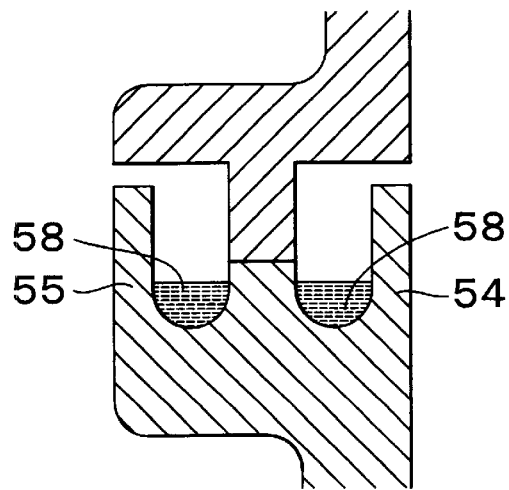
FIG. 4B is a cross-sectional view showing another exemplary embodiment of the invention using the liquid.
Figure 5:
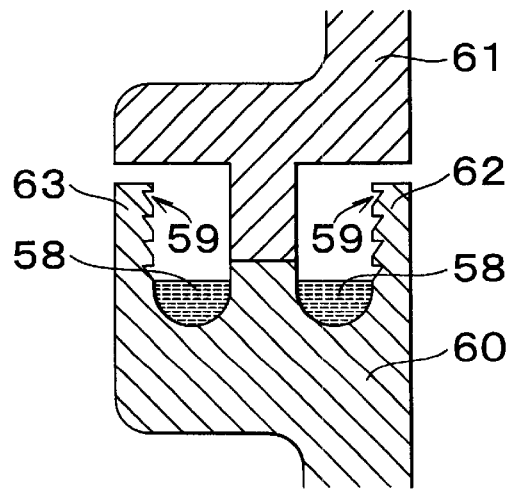
FIG. 5 is a cross-sectional view showing a further exemplary embodiment of the invention in which notches are provided on the inner surface of a projecting wall and liquid is also used, for preventing scattering of fragments of welded members.

Furthermore, as shown in FIG. 5, the liquid 58 may be received in recesses formed in a lower member 60, as in the embodiments of FIGS. 4A and 4B, while at the same time notches 59 are formed in the surfaces of projecting walls 62, 63, as in the embodiment of FIGS. 1A–1C. The liquid 58 and the notches 59 provide a synergic effect of preventing fragments of the resin parts from popping out of the structure. The notches 59 formed in this embodiment may be in the shape of wedges, or may be in the form of square or rectangular grooves as shown in FIGS. 3A–3C.

The heat resistant resin used in the invention may be selected from crystalline resins, such as polyamide resin (PA), polyacetal (POM), polyphenylene sulphite (PPS), polybutylene terephthalate (PBT). For orbital welding of these types of resins, the invention provides a sufficient effect of preventing scattering of fragments.

Figure 6:
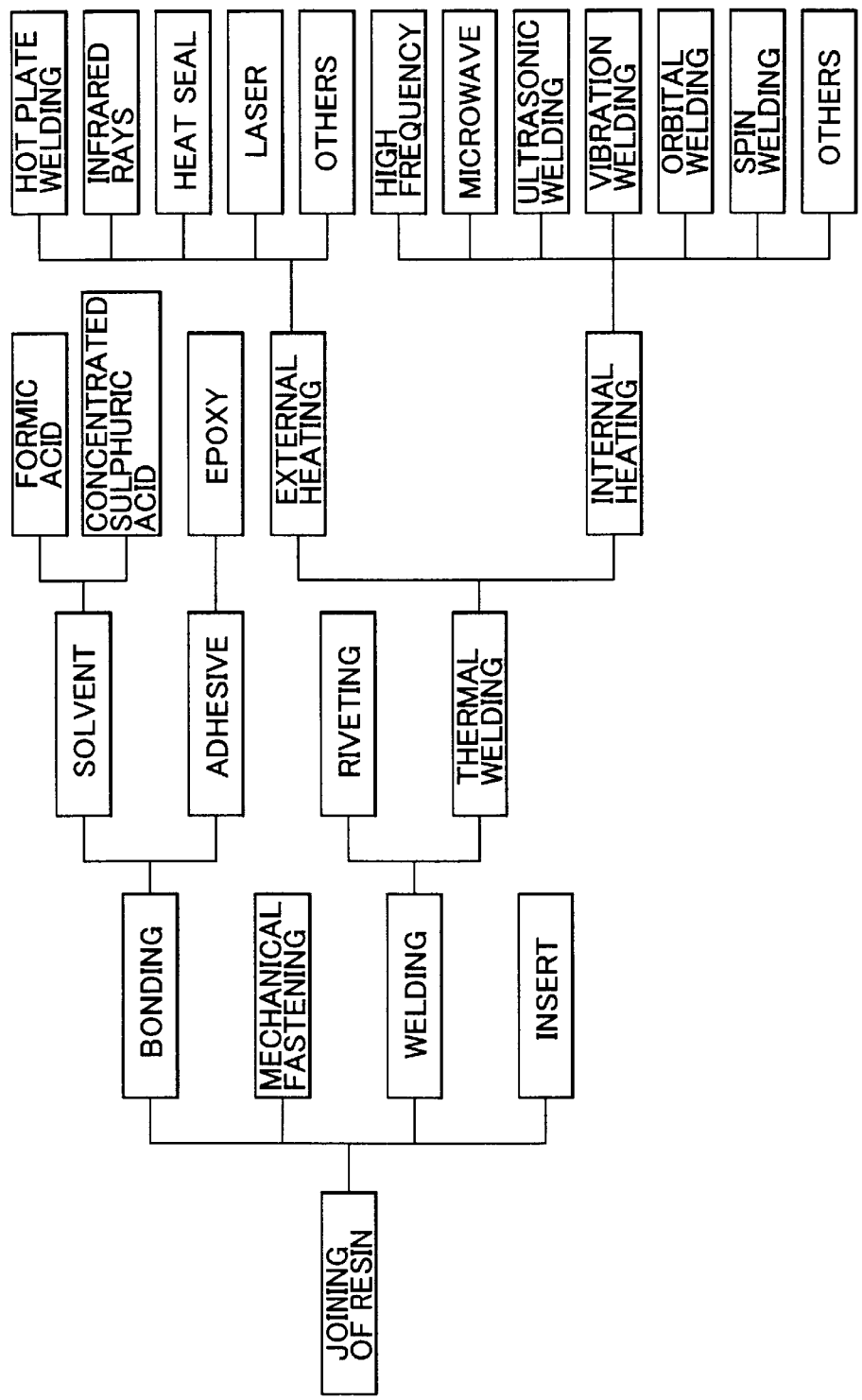
FIG. 6 is a systematical diagram in which resin joining methods are classified into some groups, one of which includes friction welding techniques including, in particular, orbital welding to which a joining structure of resin parts is subjected.
Figure 7A:
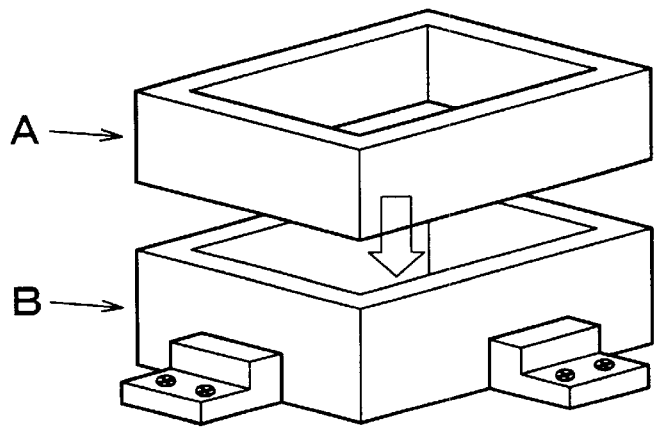
Figure 7B:
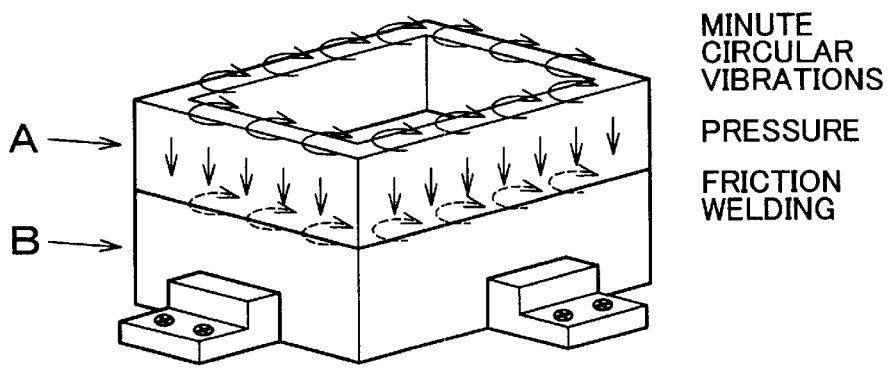
Figure 7C:
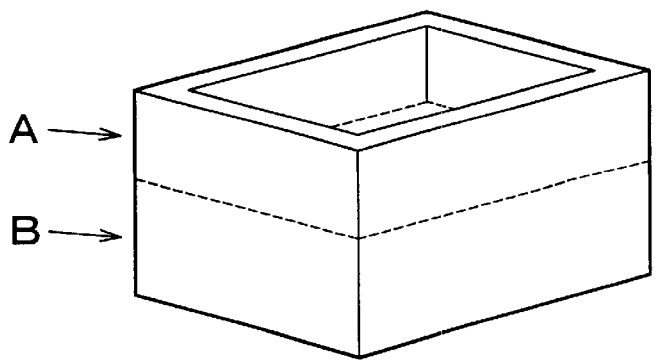

While the invention is applied to, in particular, orbital welding in the illustrated embodiments, the invention is equally applicable to various types of friction welding, such as ultrasonic welding, vibration welding and spin welding, among various resin joining technologies as indicated in FIG. 6, provided that it is concerned with joining of a plurality of resin parts utilizing heat generated by friction.

What is claimed is:

1. A joining structure, comprising:
   a first resin member and a second resin member having respective joining portions that are joined together by friction welding; and
   a projecting wall that is opposed to the joining portions of the first and second resin members with a spacing therebetween, wherein at least one notch is formed in a surface of the projecting wall that faces the joining portions of the first and second resin members.

2. The joining structure according to claim 1, wherein the projecting wall is formed as an integral part of one of the first and second resin members.

3. A joining structure comprising:

a first resin member and a second resin member having respective joining portions that are joined together by friction welding;

a projecting wall that is opposed to the joining portions of the first and second resin members with a spacing therebetween, wherein at least one notch is formed in a surface of the projecting wall that faces the joining portions of the first and second resin members; and wherein the projecting wall is formed as an integral part of one of the first and second resin members and has an end face that abuts on an opposed surface of the other of the first and second resin members at the time of completion of joining, so that fragments of the first and second resin members are confined in a space between the joining portions and the projecting wall.

4. The joining structure according to claim 1, wherein each of the at least one notch is defined by a horizontal face and an inclined face formed beneath the horizontal face.

5. The joining structure according to claim 1, wherein each of the at least one notch has a rectangular cross-sectional shape.

6. A joining structure, comprising:

a first resin member and a second resin member having respective joining portions that are joined together by frictional welding;

a projecting wall that is opposed to the joining portions of the first and second resin members with a spacing therebetween;

a liquid received in a bottom portion of a space defined between the projecting wall and the joining portions; and wherein at least one notch is formed in a surface of the projecting wall that faces the joining portions of the first and second resin members.

7. The joining structure according to claim 6, wherein the projecting wall is formed as an integral part of one of the first and second resin members.

8. A joining structure comprising:

a first resin member and a second resin member having respective joining portions that are joined together by frictional welding;

a projecting wall that is opposed to the joining portions of the first and second resin members with a spacing therebetween;

a liquid received in a bottom portion of a space defined between the projecting wall and the joining portions; and wherein the projecting wall is formed as an integral part of one of the first and second resin members and has an end face that abuts on an opposed surface of the other of the first and second resin members at the time of completion of joining, so that fragments of the first and second resin members are confined in a space between the joining portions and the projecting wall.

* * * * *